United States Patent Office 2,924,600
Patented Feb. 9, 1960

---

2,924,600

PROCESS OF PRODUCING 3β,20α YOHIMBANES

Roland Bardoneschi, Tremblay-les-Gonesse, and Georges Muller, Nogent sur Marne, France, assignors to Les Laboratoires Francais de Chimiotherapie, Paris, France, a French body corporate No Drawing. Application April 11, 1958
Serial No. 727,776

Claims priority, application France December 6, 1957

6 Claims. (Cl. 260—287)

The present invention relates to a process of producing valuable yohimbane derivatives and, more particularly, to a process of producing 3β,20α-yohimbane derivatives.

3β,20α-yohimbane compounds are of considerable interest as physiologically active agents. For instance, reserpine of the Formula I

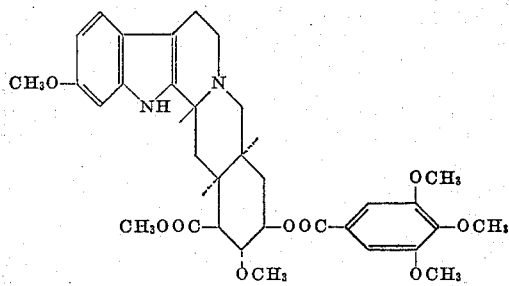

and the like compounds belong to the 3β,20α-yohimbane series.

Several syntheses of producing yohimbane compounds of the reserpine series are known to the art. They all use Δ³-yohimbene compounds as intermediates which are reduced to the corresponding saturated yohimbane compounds. Thereby, when proceeding according to the methods heretofore known, a mixture of the 3α-isomer and the 3β-isomer is obtained, which mixture contains principally the 3α-isomer or at least 50% of the same. This is especially the case when reducing such unsaturated yohimbane compounds by means of zinc and acetic acid as it is described by Weisenborn and Diassi, J. Am. Chem. Soc., 78, p. 2022 (1956). As stated hereinabove, the physiologically active yohimbane compounds of the reserpine type belong to the 3β-series, the corresponding 3α-isomers being inactive. The separation of mixtures of reserpine (3β)-compounds and isoreserpine (3α)-compounds is very burdensome and causes considerable loss of valuable material. Attempts have been made to cause stereospecific hydrogenation of unsaturated yohimbane compounds. However, such a stereospecific hydrogenation is very difficult as has been stated recently by E. Farkas et al., J. Org. Chem., 22, p. 1261 (1957).

Therefore, it is one object of the present invention to provide a simple, effective, and stereospecific process of producing 3β,20α-yohimbane compounds from corresponding unsaturated compounds.

Other objects of the present invention and advantageous features thereof will become apparent as the description proceeds.

In principle, the present invention consists in reducing Δ³-yohimbene compounds by means of zinc and aqueous perchloric acid in the presence of water miscible solvents. Thereby, the desired 3β-yohimbane compounds are obtained in a yield of about 80% or even more. For purification purposes, it is sufficient to recrystallize the reduction product from a solvent in which the 3α-isomer is more soluble than the 3β-isomer. Thereby, the desired alkaloid is obtained at once in a pure state. On working up the mother liquors, dehydrogenating the 3α-isomers, for instance, by means of mercuric acetate, to the corresponding Δ³-unsaturated derivative, and adding said Δ³-unsaturated compound to a new batch of starting material, the total yield of 3β-isomer can be rendered almost quantitative.

Advantageously, the perchlorate of the desired unsaturated yohimbane compound is used as starting material in the process according to the present invention. Instead of separating this compound from the cyclization mixture of the optcally active ester of 18β-hydroxy-17α-methoxy - 3 - oxo - 16β - methoxy carbonyl - 2,3 - seco-20α-yohimbane by means of phosphorus oxychloride, the crude cyclization product, which consists of a mixture of the corresponding phosphate and hydrochloride, may be used as starting material. Thereby, the reactant perchloric acid, which is a stronger acid than phosphoric and hydrochloric acids replaces these acids in the subsequent reduction step.

In order to achieve high yields, reduction is carried out in a homogeneous solution. Suitable water-miscible solvents, for instance, tetrahydrofuran, dioxane, acetone, ethanol, or dimethyl formamide, or mixtures thereof, are used in the presence of water. In such aqueous solvents, both perchloric acid and the perchlorate of the 3,4-dehydro yohimbane compound are readily soluble. Preferably, the reduction of the unsaturated yohimbane compound is carried out at the boiling temperature of the aqueous solvent or solvent mixture, but it may also be performed at lower temperatures. Perchloric acid is generally employed in aqueous solution of a concentration between 2% and 20%. It is also possible to carry out reduction in the presence of an aqueous solution of ferric chloride which is used in an amount of about 5% of the perchlorate of the unsaturated yohimbane compound.

Comparative tests with isoreserpine and reserpine show that the reduction of the unsaturated yohimbane compound according to the present invention involves a stereospecific reaction and that no epimerization takes place during reduction.

The following examples serve to illustrate the present invention without, however, limiting the same thereto. More particularly, variations in the nature of the solvents and the reaction temperature may be made by those skilled in the art in accordance with the principles set forth herein and in the claims annexed hereto.

EXAMPLE 1

*Reduction of the perchlorate of 3,4-dehydroreserpine by means of zinc and perchloric acid in the presence of aqueous tetrahydrofuran and acetone*

5 g. of the perchlorate of dehydroreserpine, which has a melting point of 230° C. and a specific rotatory power of $[\alpha]_D^{20} = -124° \pm 5°$ (concentration: 0.5% in aqueous tetrahydrofuran) and which is prepared according to the co-pending application of Robert Joly and Robert Bucourt, Serial No. 727,779, filed April 11, 1958, and entitled "Synthesis of Reserpine and Intermediates," are dissolved in a mixture of 50 cc. of tetrahydrofuran, 50 cc. of acetone, and 45 cc. of water. 5 cc. of 55° Bé. perchloric acid and 5 g. of zinc powder are added. The mixture is stirred and heated to boiling under reflux within about 10 minutes by passing nitrogen through the reaction vessel. After continuing stirring and refluxing for 15 minutes, the mixture is cooled, the zinc is separated by filtration, and the solvents are evaporated in a vacuum at 20° C. By scratching during distillation, the perchlorate of reserpine is caused to crystallize. The compound is filtered with suction and washed with water. Without drying, it is redissolved in 69 cc. of boiling 60% aqueous acetone. While stirring, 2 cc. of concentrated ammonia are added to the still warm solution which, thereupon, turns cloudy, and crystals separate. The mixture is allowed to stand for 2 to 3 minutes to cause progressive crystallization and is then chilled for about 15 minutes in ice water. The crystals are filtered with suction and washed on the filter 4 times with 60% aqueous acetone, each time with 10 cc. thereof. After drying at 90° C., the yield of pure reserpine is 3.4 g. (76% of the theoretical amount). The compound melts at 297–298° C. and has a specific rotatory power of $[\alpha]_D^{20} = -124° \pm 3°$ (concentration: 1% in chloroform).

When evaporating the mother liquors to dryness, a mixture of isoreserpine and reserpine is recovered which, after purification, may be dehydrogenated to dehydroreserpine which is again reduced as described hereinabove.

EXAMPLE 2

*Reduction of the perchlorate of 3,4-dehydroreserpine by means of zinc and perchloric acid in aqueous acetone*

1 g. of 3,4-dehydroreserpine perchlorate is dissolved in a mixture of 8 cc. of acetone, 4 cc. of water, and 0.5 cc. of 55° Bé. perchloric acid. 1 g. of zinc powder is added and the mixture is heated to boiling under reflux within about 10 minutes while stirring and passing nitrogen through the reaction vessel. Stirring and refluxing is continued for about 10 minutes, the zinc is removed by filtration from the hot solution and is washed twice with 1 cc. of boiling acetone. The acetone wash liquors are combined with the filtrate. On cooling, reserpine perchlorate crystallizes. After chilling, 56 cc. of water are added slowly at +5° C. while stirring. Stirring is continued for 15 minutes at this temperature and the crystals are filtered with suction and washed with water. The moist reserpine perchlorate is dissolved in 13 cc. of boiling 60% aqueous acetone. 0.4 cc. of concentrated ammonia are added to the warm solution while stirring. Reserpine crystallizes. The mixture is cooled to +5° C. for one hour. The crystals are filtered with suction, washed on the filter twice with 1 cc. of 60% aqueous acetone and dried at 90° C. The resulting reserpine (748 mg.) is purified by a trituration with 2 parts by volume of methyl acetate and by a second trituration with 2 parts by volume of methanol. After drying in a vacuum at 90° C., 645 mg. (75% of the theoretical amount) of pure reserpine, melting at 298° C. are obtained.

When working with the same amount of 3,4-dehydroreserpine perchlorate, perchloric acid and zinc powder as described hereinabove, and replacing aqueous acetone as solvent by aqueous dimethylformamide, aqueous dioxane, aqueous ethanol, or aqueous tetrahydrofuran, about the same results are obtained.

EXAMPLE 3

*Reduction of the perchlorate of 3,4-dehydrodeserpidine by means of zinc and perchloric acid in the presence of aqueous tetrahydrofuran and acetone*

The perchlorate of 3,4-dehydrodeserpidine containing solvent of crystallization, melting at 214° C., and having a specific rotatory power of $[\alpha]_D^{20} = -50° \pm 3°$ (concentration: 1% in 45% aqueous tetrahydrofuran), is prepared according to the co-pending application of Robert Joly and Robert Bucourt, Serial No. 727,779, filed April 11, 1958, and entitled "Synthesis of Reserpine and Intermediates." On treating equimolecular amounts of said perchlorate of 3,4-dehydrodeserpidine in place of 3,4-dehydroreserpine, as described in Example 1, pure deserpidine is obtained in a yield of about 75%.

EXAMPLE 4

*Reduction of the perchlorate of 3,4-dehydrorescinnamine by means of zinc and perchloric acid in the presence of aqueous tetrahydrofuran and acetone*

On treating equimolecular amounts of 3,4-dehydrorescinnamine perchlorate which melts at 190° C. and has a specific rotatory power of $[\alpha]_D^{20} = -116° \pm 3°$ (concentration: 1% in 45% aqueous tetrahydrofuran) in place of 3,4-dehydroreserpine as described in Example 1, pure rescinnamine is obtained in a yield of 79%.

EXAMPLE 5

*Reduction of the perchlorate of 3,4-dehydro-11-methyl deserpidine by means of zinc and perchloric acid in the presence of aqueous tetrahydrofuran and acetone.*

The perchlorate of 3,4-dehydro-11-methyl deserpidine is prepared by causing cyclization of $17\alpha$-methoxy-$16\beta$-methoxy carbonyl-11-methyl-$18\beta$-(3',4',5'-trimethoxybenzoyloxy)-3-oxo-2,3-seco-$20\alpha$-yohimbane with phosphorus oxychloride, recrystallizing the reaction product from ethyl acetate, and converting it to the corresponding perchlorate according to the method described in the co-pending application of Robert Joly and Robert Bucourt cited hereinabove. 480 mg. of said perchlorate of 3,4-dehydro-11-methyl deserpidine are added to 10 cc. of acetone, 10 cc. of tetrahydrofuran, and 10 cc. of an aqueous perchloric acid solution prepared by mixing 0.5 cc. of 65% perchloric acid with 9.5 cc. of water. After the addition of 500 mg. of zinc powder, the mixture is refluxed for 15 minutes, poured on ice, rendered alkaline by the addition of ammonia, and extracted by means of methylene chloride. The extracts are dried over magnesium sulfate and are evaporated to dryness. The remaining base is dissolved in methanol. On addition of dilute nitric acid, the corresponding nitrate crystallizes.

After treatment with ammonia, 300 mg. of 11-methyl deserpidine are obtained. The compound melts at 275° C. and has a specific rotatory power of $[\alpha]_D^{20} = -132° \pm 10°$ (concentration: 0.25%, in chloroform).

We claim:

1. In a process of producing $3\beta,20\alpha$-yohimbane compounds, the steps comprising dissolving $\Delta^3$-yohimbenes having the structural formula

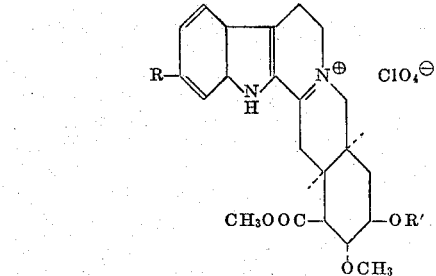

where R is selected from the group consisting of hydrogen, methyl and methoxy and R' is selected from the group consisting of 3,4,5-trimethoxybenzoyl and 3,4,5-trimethoxycinnamoyl radicals, in water and at least one water-miscible organic solvent selected from the group consisting of acetone, tetrahydrofuran, dimethylformamide, ethanol and dioxane, and reducing said $\Delta^3$-yohimbenes by means of refluxing said solution with zinc and sufficient perchloric acid to give an aqueous concentration of from about 2 to about 20%.

2. The process according to claim 1, wherein the perchlorate of 3,4-dehydroreserpine is used as starting material.

3. The process according to claim 1, wherein the perchlorate of 3,4-dehydrodeserpidine is used as starting material.

4. The process according to claim 1, wherein the perchlorate of 3,4-dehydrorescinnamine is used as starting material.

5. The process according to claim 1, wherein the perchlorate of 3,4-dehydro-11-methyl deserpidine is used as starting material.

6. The method of claim 1 wherein said 3β,20α-yohimbane compounds are separated from the reaction mixture by crystallization and the 3α,20α-yohimbane compounds are dehydrogenated and recycled.

References Cited in the file of this patent

Farkas et al.: Jour. Org. Chem., vol. 22, pp. 1261–1263 (1957).

Weisenborn: Jour. of the Amer. Chem. Soc., vol. 78, pp. 2022–2023 (1956).

UNITED STATES PATENT OFFICE
CERTIFICATE OF CORRECTION

Patent No. 2,924,600

February 9, 1960

Roland Bardoneschi et al.

It is hereby certified that error appears in the printed specification of the above numbered patent requiring correction and that the said Letters Patent should read as corrected below.

Column 4, lines 47 to 58, claim 1, the formula should appear as shown below instead of as in the patent:

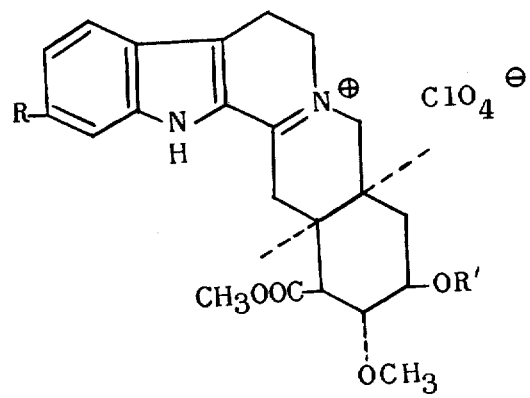

Signed and sealed this 18th day of April 1961.

(SEAL)
Attest:
ERNEST W. SWIDER
Attesting Officer

DAVID L. LADD
Commissioner of Patents